United States Patent Office 2,748,151
Patented May 29, 1956

2,748,151
PURIFICATION OF ACID CHLORIDES

Kenneth C. D. Hickman and Edward E. Harris, Rochester, N. Y.

No Drawing. Application July 22, 1954, Serial No. 445,175

11 Claims. (Cl. 260—408)

The present invention relates to the production of high molecular weight saturated aliphatic acid chlorides and more particularly to a new, improved and more efficient process for purifying crude acid chlorides of this character to obtain a more stable and desirable end product in increased yield. More specifically, the invention contemplates and provides a process involving a novel treatment step employed prior to final distillation of the crude acid chloride to enhance and improve the overall distillation performance in several important aspects and thus provide an increased yield of final, stable acid chloride.

High molecular weight aliphatic acid chlorides are useful in the preparation of esters, amides, etc. which have found considerable application in several fields. In the pharmaceutical field, for example, aliphatic esters of vitamin A, stilbesterol, ascorbic acid and chloromycetin, generally prepared from the fatty acid chlorides, have proven clinically efficacious.

In the particular case of vitamin A, the palmitate has come to be the most stable and generally satisfactory form of that material. This ester is most conveniently and economically formed from palmitoyl chloride. The palmitoyl chloride reacts with the hydroxy group of the vitamin A which terminates the side chain to form an ester. This derivative provides a more stable form of vitamin A. Approximately equal amounts of vitamin A and palmitoyl chloride are reacted to form the vitamin A palmitate.

While the present process is applicable to the purification of high molecular weight saturated acid chlorides in general, as will be pointed out more particularly hereinafter, the invention, for the present at least and purely for the sake of simplicity and clarity of subject-matter presentation, will be described with respect to the purification of crude palmitoyl chloride, it being obvious and distinctly understood, of course, that the invention is in nowise limited thereto.

Palmitoyl chloride is generally prepared by reacting palmitic acid with either phosphorous trichloride, phosphorous pentachloride or thionylchloride, the reaction with phosphorous trichloride being generally preferred for reasons of economy, facility of handling, consistency of reaction, and ease of removal of by-products. Commercially, pure fatty acids are very seldom used. In the case of palmitic acid, for instance, the commercial material normally contains about 5% of stearic acid and a like amount of oleic acid as impurities. An example of this type of palmitic acid is Neo Fat 1-56 produced by Armour and Company.

After the reaction product of phosphorous trichloride and the crude palmitic acid has been degassed to remove $PCl_3$ and HCl, the reaction mixture is subjected to distillation under vacuum. It is at this stage of the process that known procedures are definitely found wanting. As a general rule the distillation of high molecular weight saturated acid chlorides is usually quite unsatisfactory, and this is particularly true with acid chlorides which have been made from commercial fatty acids.

In order to illustrate the inherent procedural difficulties attending known distillation processes, the following is given by way of example:

Crude palmitoyl chloride, prepared by the $PCl_3$ method, is degassed to remove excess $PCl_3$ and HCl prior to distillation. The material, having an iodine number of about 0.60, is then distilled at approximately 98–102° C. under a vacuum of 0.05 mm. in 80–88% yield. The distillation residue varies from 12–20%. The amount of residue is apparently independent of the method of preparation since the use of other chlorinating agents does not appreciably decrease the amount. This residue is believed to be due, in large part, to polymerization and decomposition induced by the unsaturated acid chlorides present and to polymers resulting from the following sequence:

$$C_{14}H_{29}\text{---}CH_2\text{---}COCl \rightarrow C_{14}H_{29}\text{---}HC\text{=}C\text{=}O + HCl \times (C_{14}H_{29}\text{---}CH\text{=}C\text{=}O) \rightarrow \text{polymers}$$

The amount and character of the distillation residue is apparently dependent upon the length of heating, degree of heating, degassing procedure, as well as several other less effective factors.

It has also been found that distillation does not succeed in fractionating out the unsaturates present, since the iodine value of the distillate is usually about the same as the original value of the crude palmitoyl chloride employed. Attempts to obtain a material of lower iodine value by taking cuts during the distillation are unrewarding since the lowest values thus obtained from the above material approximate 0.5.

It has now been found, in accordance with the present invention, that the foregoing and other difficulties attending known distillation procedures may be overcome by so treating the crude palmitoyl chloride, prior to distillation, in such a manner that the majority of the oleoyl chloride, as well as other unsaturates, are converted to more stable compounds. To accomplish this, reagents have been selected which add to and satisfy the double bonds in the unsaturated impurities found in the crude chloride and thus convert these unsaturates to compounds which not only exhibit greater heat stability, but remain in the distillation residue. Moreover, the reagents tend to inhibit or at least minimize the polymerization and decomposition above referred to.

The foregoing transformation and stabilization is carried out most easily and most economically, in accordance with the invention, by subjecting the crude acid chloride, prior to distillation, to the action of a halogen, preferably chlorine gas, which reacts satisfactorily even at room temperature, with the unsaturate linkage in the oleoyl chloride impurity as well as other unsaturated linkages. The excess chlorine is easily removed by flushing the vessel with a dry inert gas such as nitrogen, or by placing the system under a vacuum.

In was found in the course of investigating the chlorination that a small amount of chlorine other than that due to the acyl halide part of the molecule, was found even in the non-chlorinated material. The results of a quantitative study of both the chlorinated and unchlorinated materials can be summarized as follows:

*Table I*

|  | Percent Chain Chlorine | Iodine No. (Hanus) |
|---|---|---|
| Crude Palmitoyl Chloride (starting material) |  | 0.60 |
| Acid Chloride Derived from Unchlorinated Distillate: |  |  |
| Sample A | 0.04 | 0.66 |
| Sample B | 0.04 | 0.60 |
| Sample C | 0.15 | 0.60 |
| Acid Chloride Derived from Chlorinated Distillate: |  |  |
| Sample A | 0.11 | 0.08 |
| Sample B | 0.26 | 0.13 |
| Sample C | 0.22 | 0.11 |

It is evident from the data shown that no appreciable decrease in iodine value has occurred in the unchlorinated distillate. This precludes the probability of the chlorine present in the unchlorinated material being present in the 9 or 10 position to any appreciable extent.

The effect of the halogenation treatment on the distillation performance of crude palmitoyl chloride is quite pronounced. The distillation time is shortened appreciably, a more uniform distillation rate is observed, and considerably less difficulty is experienced in maintaining the proper vacuum, particularly when relatively large quantities are distilled by the batch process. Moreover, the end product is practically colorless and the odor is improved over the unchlorinated distilled material.

An advantage of the halogenation process is also found in the quantity of residue which remains in the distilling vessel. The quantity is 5–10% as compared with 12–20% for the unchlorinated material. Thus the distillation yield has definitely been improved. Without the halogenation treatment the distillation yield for palmitoyl chloride varies between 80–88%, whereas with the halogenation treatment, the yield is raised to 90–95%.

A further advantage of this low residue is to permit the processing of several runs in the still without removing the residue. It has, in fact, been possible to introduce crude (degassed at 90–100° C. and 1 mm. pressure) into the high vacuum still at a temperature of 110° C. while distillation is in progress. The pressure increased briefly and then dropped back to a distilling pressure of 0.05 mm. This procedure may be repeated several times before the quantity of residue becomes sufficiently large to warrant cleaning the still. Thus it becomes possible to run the still semicontinuously for extended periods.

The comparative distillation performances are summarized in the following table:

*Table II*

|  | Chlorinated | Unchlorinated |
| --- | --- | --- |
| Degassing Time...............minutes.. | 30 | 60 |
| Distilling Time..................do.... | 175 | 225 |
| Distillation Yield..............percent.. | 91.8 | 83.7 |
| Residue.......................do.... | 7.85 | 12.9 |

It will be understood, of course, that halogenating agents other than gaseous chlorine may be employed, such as elemental bromine and iodinating compounds such as iodine monochloride.

As pointed out above, it will also be distinctly understood that the process disclosed hereinabove as applying specifically to the treatment of crude palmitoyl chloride, can likewise and with facility be applied to the purification of crude acid chlorides of other saturated fatty acids containing eight or more carbon atoms such as the crude acid chlorides of caprylic, pelargonic, capric, lauric, myristic, palmitic, margaric, stearic, arachidic, behenic, and melissic acids, or mixtures of any two or more of these crude acid chlorides or similar chlorides, particularly those crude fatty acid chlorides which contain small percentages of unsaturated compounds as impurities. Moreover, it is obvious that the disclosed process is equally applicable to crude acid chlorides derived from animal or vegetable sources, for example coconut oil.

It must be understood that the present invention is predicated upon the discovery that the aforesaid halogenation prior to distillation must be substantial halogenation at the unsaturate linkage in the acid chloride impurities with practically no substitution halogenation or at least a minimum of substitution halogenation of either the acid chloride or its impurities. Moreover, after substantial addition halogenation is obtained, with a minimum of substitution halogenation, the treated acid chloride is distilled as a whole, so to speak. In other words, fractionation is neither desirable nor necessary.

Addition halogenation at the impurity double bonds, according to the invention, is carried out at room temperature without the addition of external heat. During the course of the addition halogenation, the temperature never rises more than about 12° C. The time of room temperature addition halogenation varies from 10 minutes to 5 hours according to the halogenating agent employed and the iodine number or value desired, as will be pointed out more particularly hereinbelow. Halogenating the double bonds with bromine and iodine monochloride is much more rapid (requiring about 10 minutes) as compared with the use of chlorine (requiring 1 to 5 hours).

The criterion of optimum halogenation is dependent upon the drop in initial unsaturation and the consequent lowering of the iodine number. It has been found that there is a sharp drop in initial unsaturation which soon levels out. To illustrate this point, the following data was observed during the addition chlorination of crude palmitoyl chloride:

| Time of Chlorination, 20 mm. head | Iodine Value |
| --- | --- |
| 0 hour.......................... | 0.66 |
| 1 hour.......................... | 0.26 |
| 2 hours......................... | 0.18 |
| 3 hours......................... | 0.14 |
| 4 hours......................... | 0.13 |

Even after one hour of chlorination good distillation is obtained.

Crude acid chlorides must be halogenated at the double bonds of the impurities to a point where the treated crude has a predetermined iodine number. This iodine number, of course, depends upon the quantity and character of the unsaturated impurities in the crude acid chloride and will vary inversely as the chain length. For example, in the case of the C–16 chain (crude palmitoyl chloride) halogenation must be carried on until the iodine number reaches a value below about 0.3, while in the case of the C–12 chain (lauroyl chloride found in crude cocoanut fatty acid chloride) the iodine number should be reduced to a value below about 1.0.

The following specific examples will serve to illustrate, but in no way limit, the process of the present invention:

*Example 1.*—A 22 liter flask was fitted with a sealed stirrer, thermometer, gas inlet and outlet tubes, and was charged with 10,914 g. (approximately 39.4 moles) of crude palmitoyl chloride with an iodine value of about 0.7 (Hanus). With stirring, a total of 511 g. (7.2 moles) of dry chlorine gas was added over a period of 5 hours, during which time the temperature rose from 27° C. to 36° C. After degassing, the material was distilled at 91–92° C. at 0.05 mm. yielding 93.7% of water-white distillate with an iodine value of 0.08. The chain chlorine of the fatty acid was found to be 0.22%.

A sample of the same crude material which was untreated yielded 80.9% of distillate with an iodine value of 0.6. The chain chlorine of the fatty acid was found to be 0.15%.

*Example 2.*—A one liter flask was equipped in the same manner as the large flask in Example 1 and charged with 500 g. (1.81 moles) of crude palmitoyl chloride of the type employed in Example 1. With stirring, 45 g. (0.25 mole) of bromine were added over a period of 10 minutes. Toward the end of the addition, the bromine no longer decolorized. The temperature rose during the course of the reaction from 24.5° to 27° C. After degassing, the product was distilled, yielding 90% distillate with an iodine value of 0.05.

*Example 3.*—500 g. of crude palmitoyl chloride of the type employed in Example 1 was treated with 45 g. (0.278 mole) of iodine monochloride for 10 minutes during which time the temperature rose from 25° C. to 34° C. After removing the excess reagent, the material was distilled to yield 90% of a product with an iodine value of 0.05. The chain halogen of the fatty acids was found to be 0.07%.

*Example 4.*—In an apparatus similar to Example 1 was placed 410 g. (1.84 moles) of crude acid chloride prepared from commercial distilled cocoanut fatty acid (Acid No. 275.3). The crude acid chloride has an iodine value of about 8.0 (Hanus). Chlorine was passed into the material at room temperature with stirring for 3 hours during which time 46 g. of chlorine was added and the temperature rose approximately 12° C. After removing excess chlorine under vacuum, the material was distilled at 84–93° C. at 0.02 mm. to yield 72.5% of product with an iodine number of 0.11. The chain chlorine of the fatty acids was found to be 0.11%. Without preliminary chlorination, distillation gave 68% of product with an iodine number of substantially the same as the crude acid chloride.

This application is a continuation in part of our prior application Serial Number 273,342, filed February 25, 1952.

What is claimed is:

1. A process for purifying a crude saturated higher fatty acid chloride containing minor amounts of unsaturated compounds as impurities which comprises subjecting said crude chloride to the action of a halogenating agent to reduce the iodine number to a value below about 1.0 and thus to effect substantial addition halogenation of the double bonds of the unsaturated impurities but substantially no substitution halogenation of the acid chloride, and then distilling the resulting material under vacuum.

2. A process for purifying a crude saturated higher fatty acid chloride having at least 8 carbon atoms in the chain and containing minor amounts of unsaturated compounds as impurities which comprises subjecting said crude chloride to the action of a halogenating agent to reduce the iodine number to a value below about 1.0 and thus effect substantial addition halogenation of the double bonds of the unsaturated impurities but substantially no substitution halogenation of the acid chloride, and then distilling the resulting material under vacuum.

3. The process of claim 2 in which the halogenation agent is gaseous chlorine.

4. The process of claim 2 in which the halogenation agent is elemental bromine.

5. The process of claim 2 in which the halogenation agent is iodine monochloride.

6. A process for purifying crude palmitoyl chloride containing minor amounts of unsaturated compounds as impurities which comprises subjecting said crude chloride to the action of a halogenating agent to reduce the iodine number to a value below about 0.3 and thus effect substantial addition halogenation of the double bonds of the unsaturated impurities but substantially no subsitution halogenation of the acid chloride, and then distilling the resulting material under vacuum.

7. The process of claim 6 in which the halogenation agent is gaseous chlorine.

8. The process of claim 6 in which the halogenation agent is elemental bromine.

9. The process of claim 6 in which the halogenation agent is iodine monochloride.

10. A process for purifying crude cocoanut fatty acid chloride containing minor amounts of unsaturated compounds as impurities which comprises subjecting said crude chloride to the action of a halogenating agent to reduce the iodine number to a value below about 1.0 and thus to effect substantial addition halogenation of the double bonds of the unsaturated impurities but substantially no substitution halogenation of the acid chloride, and then distilling the resulting material under vacuum.

11. The process of claim 10 in which the halogenation agent is gaseous chlorine.

References Cited in the file of this patent

UNITED STATES PATENTS 2,255,230    Ross et al. _____ Sept. 9, 1941

OTHER REFERENCES

Markley: "Fatty Acids," copyright 1947, pages 335 and 348.